United States Patent
Hsu

(10) Patent No.: US 11,403,768 B2
(45) Date of Patent: Aug. 2, 2022

(54) METHOD AND SYSTEM FOR MOTION PREDICTION

(71) Applicant: Industrial Technology Research Institute, Hsinchu (TW)

(72) Inventor: Fu-Song Hsu, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 2 days.

(21) Appl. No.: 16/907,112

(22) Filed: Jun. 19, 2020

(65) Prior Publication Data

US 2021/0201502 A1 Jul. 1, 2021

(30) Foreign Application Priority Data

Dec. 27, 2019 (TW) .................................. 10814805.4

(51) Int. Cl.
| | | |
|---|---|---|
| G06T 7/579 | (2017.01) | |
| G06T 7/207 | (2017.01) | |
| G06T 7/292 | (2017.01) | |
| G06T 7/73 | (2017.01) | |
| G06T 7/194 | (2017.01) | |
| G06V 40/16 | (2022.01) | |

(52) U.S. Cl.
CPC .............. *G06T 7/207* (2017.01); *G06T 7/194* (2017.01); *G06T 7/292* (2017.01); *G06T 7/579* (2017.01); *G06T 7/74* (2017.01); *G06V 40/171* (2022.01); *G06T 2207/20081* (2013.01); *G06T 2207/20084* (2013.01); *G06T 2207/30196* (2013.01)

(58) Field of Classification Search
CPC .......... G06T 7/579; G06T 7/194; G06T 7/292; G06T 7/74; G06K 9/00281
See application file for complete search history.

(56) References Cited

U.S. PATENT DOCUMENTS

| | | |
|---|---|---|
| 9,697,609 B2 | 7/2017 | Kim et al. |
| 2012/0239174 A1 | 9/2012 | Shotton et al. |

(Continued)

FOREIGN PATENT DOCUMENTS

| | | | |
|---|---|---|---|
| CN | 101894278 | * | 11/2010 |
| CN | 101894278 A | | 11/2010 |

(Continued)

OTHER PUBLICATIONS

Taiwan Patent Office, Office Action, Patent Application No. 108148054, dated Aug. 28, 2020, Taiwan.

(Continued)

*Primary Examiner* — Myron Wyche

(57) ABSTRACT

A method for motion prediction is provided. The method includes: capturing, by a single camera, a plurality of cameras or 3D software, images of an object at multiple angles to generate multi-view images of the object; synthesizing motion capture (MoCap) data according to the multi-view images; projecting a masking object onto the object to generate multi-view training images, wherein the multi-view training images are images in which parts of limbs of the object are unoccluded and other parts of the limbs of the object are occluded; and using the motion capture data and the multi-view training images to train a predictive model.

18 Claims, 12 Drawing Sheets

● Unoccluded joints
○ Occluded joints

(56) References Cited

U.S. PATENT DOCUMENTS

| | | | | |
|---|---|---|---|---|
| 2014/0045593 A1* | 2/2014 | Giusti | ............... | A63F 13/213 |
| | | | | 463/32 |
| 2016/0307032 A1* | 10/2016 | Butler | ............ | G06K 9/00355 |
| 2018/0374273 A1* | 12/2018 | Holzer | ............ | H04N 5/23238 |
| 2019/0004597 A1 | 1/2019 | Gai et al. | | |

FOREIGN PATENT DOCUMENTS

| | | | | |
|---|---|---|---|---|
| CN | 106127120 A | 11/2016 | | |
| CN | 107909543 A | 4/2018 | | |
| EP | 3480788 A1 | 5/2019 | | |
| JP | 2019027882 A | 2/2019 | | |
| TW | I346311 B | 8/2011 | | |
| TW | 201143866 A | 12/2011 | | |
| TW | 1534739 * | 5/2016 | ............ | G06F 7/00 |
| TW | I534739 B | 5/2016 | | |
| WO | WO2006105094 A2 | 10/2006 | | |

OTHER PUBLICATIONS

Insafutdinov, Eldar, et al., "ArtTrack: Articulated Multi-person Tracking in the Wild", CVPR, May 2017, pp. 1-12.

Insafutdinov, Eldar, et al., "Deeper Cut: A Deeper, Stronger, andFaster Multi-Person Pose Estimation Model", ECCV, Nov. 2016, pp. 1-22, US.

Rhodin, Helge, et al., "EgoCap: Egocentric Marker-less Motion Capture with Two Fisheye Cameras", SIGGRAPH Asia, 2016, pp. 1-11, US.

He, Kaiming, et al., "Mask R-CNN", CVPR, 2017, pp. 1-12, US.

Xu, Weipeng, et al. "Mo2Cap2: Real-time Mobile 3D MotionCapture with a Cap-mounted Fisheye Camera" IEEE Transactions on Visualization and Computer Graphics, May 2019, pp. 2093-2101. Vol. 25, No. 5, IEEE, US.

\* cited by examiner

- Joints of the right hand
- Joints of the left hand

• Unoccluded joints
o Occluded joints

METHOD AND SYSTEM FOR MOTION PREDICTION

CROSS REFERENCE TO RELATED APPLICATIONS

This application claims priority from Taiwan Patent Application No. 108148054, filed on Dec. 27, 2019, the disclosure of which is incorporated herein by reference in its entirety.

TECHNICAL FIELD

The disclosure relates to a method and a device for motion prediction.

BACKGROUND

Motion capture has numerous applications. For example, in filmmaking, digital models generated using motion capture could be used as the basis for the motion of computer-generated characters or objects. In sports, motion capture could be used by coaches to study an athlete's movements and guide the athlete toward improved body mechanics. In video games or virtual-reality applications, motion capture could be used to allow a person to interact with a virtual environment in a natural way, e.g., by waving to a character, pointing at an object, or performing an action such as swinging a golf club or baseball bat.

The term "motion capture (MoCap)" refers generally to processes that capture the movement of a subject in three-dimensional (3D) space and translate that movement into, for example, a digital model or another representation. Motion capture is typically used with complex subjects that have multiple separately articulating members whose spatial relationships change as the subject moves. For instance, if the subject is a walking person, not only does the whole body move across space, but the position of arms and legs relative to the person's core or trunk are constantly shifting. Motion capture systems are typically interested in modeling this articulation.

Most existing motion capture systems rely on markers or sensors worn by the subject while executing the motion and/or on the strategic placement of numerous cameras in the environment to capture images of the moving subject from different angles. Such systems tend to be expensive to construct. In addition, markers or sensors worn by the subject could be cumbersome and interfere with the subject's natural movement. In addition, to accurately capture human motion, motion capture systems require a specific background (green screen) or a clear field. When there are other items in the field, the other items will block the fields of view of the cameras and cause a problem of poor recognition of parts of the limbs. Furthermore, since the motion capture systems could only track people, if other objects are added to the human body, other objects may be mistakenly recognized as part of a human limb, which may result in tracking inaccuracy, or even tracking failure.

Consequently, a method and a system for motion prediction are needed to improve the problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

In an embodiment, a method for motion prediction, comprising: capturing, by a single camera, a plurality of cameras or 3D software, images of an object at multiple angles to generate multi-view images of the object; synthesizing motion capture (MoCap) data according to the multi-view images; projecting a masking object onto the object to generate multi-view training images, wherein the multi-view training images are images in which parts of limbs of the object are unoccluded and other parts of the limbs of the object are occluded; and using the motion capture data and the multi-view training images to train a predictive model.

In an embodiment, a system for motion prediction, comprising: a device for motion prediction, wherein the device for motion prediction executes: capturing, by a single camera, a plurality of cameras or 3D software, images of an object at multiple angles to generate multi-view images of the object; synthesizing motion capture (MoCap) data according to the multi-view images; projecting a masking object onto the object to generate multi-view training images, wherein the multi-view training images are images in which parts of limbs of the object are unoccluded and other parts of the limbs of the object are occluded; and using the motion capture data and the multi-view training images to train a predictive model.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
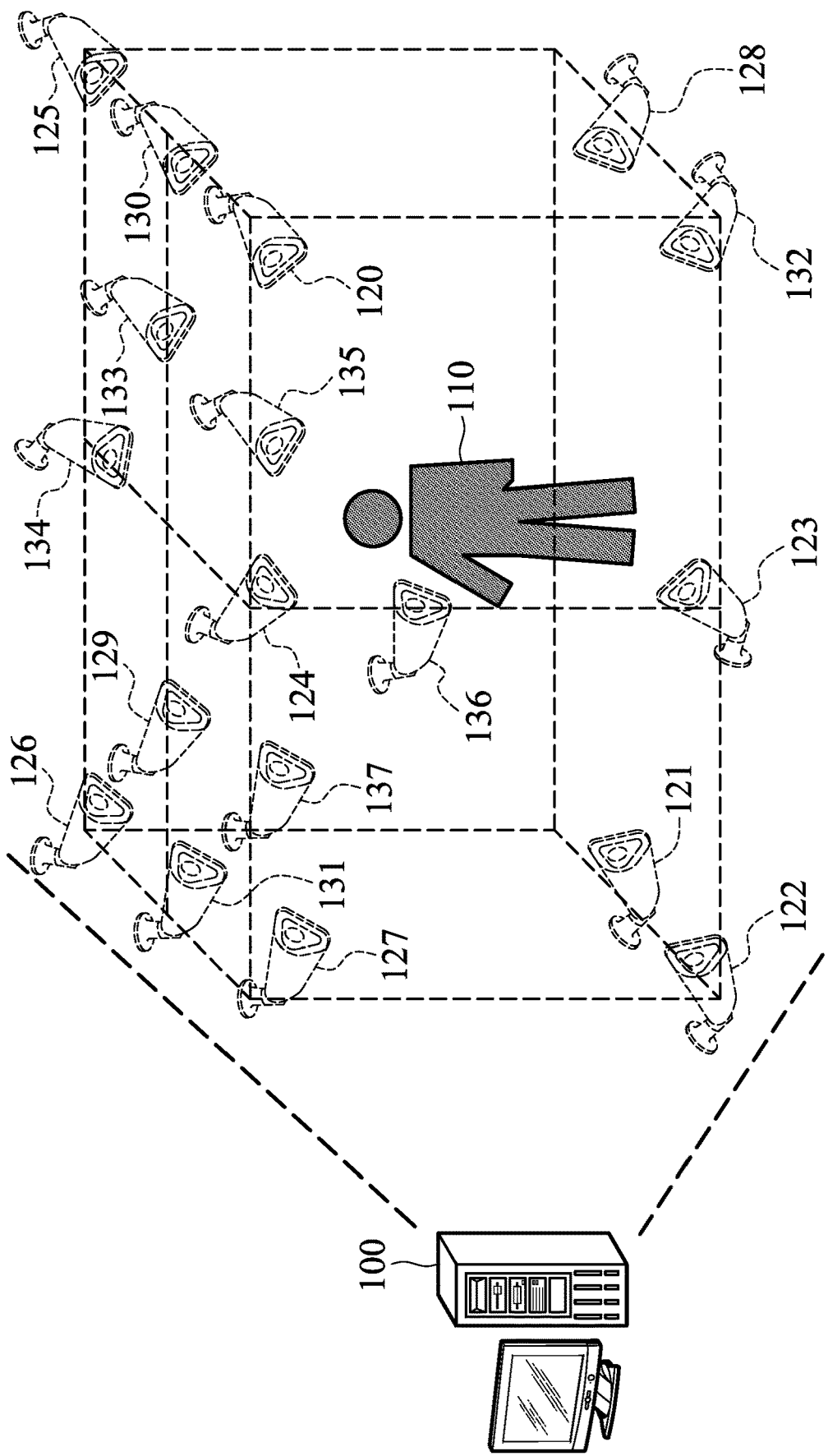
FIG. 1 shows a schematic diagram illustrating an environment using a device for motion prediction according to one embodiment of the present disclosure.

FIG. 1 shows a schematic diagram illustrating an environment using a device for motion prediction 100 according to one embodiment of the present disclosure. The device for motion prediction 100 may capture a motion process of a user 110 by using three-dimensional (3D) software or physically setting up a plurality of cameras 120~137. It should be noted that the number of the cameras 120~137 could be expanded to more than 18 or less than 18 (in one embodiment, the number is 24), and the disclosure should not be limited to the embodiment shown in FIG. 1. In another embodiment, the device for motion prediction 100 could also capture the motion process of the user 110 by using a single camera moving to different angles, or capture the motion process of the user 110 by using a plurality of cameras fixed at different angles.

Figure 2:
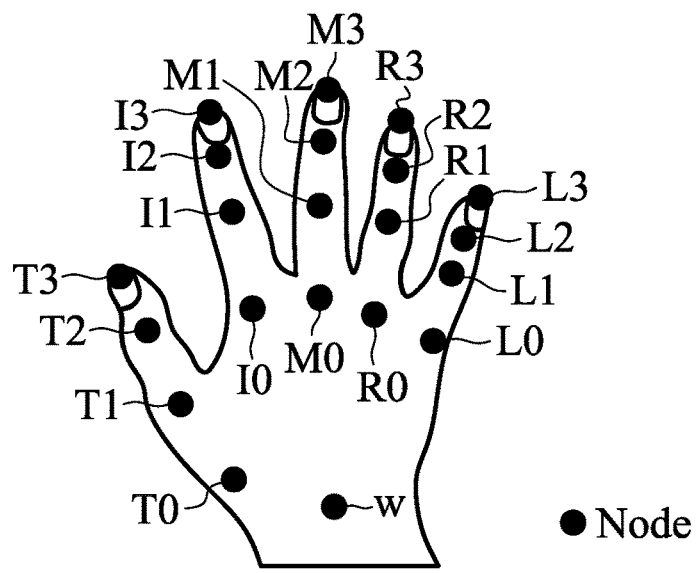
FIG. 2 is a schematic diagram illustrating the labeled data of a user's hand according to an embodiment of the disclosure.

As shown in FIG. 1, in this environment, the cameras 120~137 are arranged around the user 110 at multiple angles to generate multi-view images of the user 110. The device for motion prediction 100 could synthesize motion capture (MoCap) data according to the multi-view images and generate labeled data, wherein the motion capture data may comprise images of limbs and joints of the user 110 composed of at least 14 nodes, the images are labeled with the three-dimensional coordinates of the 14 nodes, and the labeled data is the three-dimensional coordinate (x, y, z) of each node in space. As an example, FIG. 2 is a schematic diagram illustrating the labeled data of a user's hand according to an embodiment of the disclosure. As shown in FIG. 2, the hand is composed of at least 21 nodes w, T0~T3, I0~I3, M0~M3, R0~R3 and L0~L3. The labeled data of the 21 nodes is shown in Table 1.

TABLE 1

| Labeled data of nodes composing the hand |
|---|
| 2.382103, −2.742337, −1.191106, 2.03083, −2.225955, −0.8046129, 1.57182, −1.930631, −0.6586813, |
| 1.181372, −1.584203, −0.4149913, 0.6589953, −1.377144, −0.2189027, 1.866434, −1.001956, −0.8794309, |
| 1.806675, −0.5077438, −0.7708876, 1.770569, −0.1704822, −0.7042114, 1.725169, 0.2265553, −0.6747259, |
| 2.239691, −0.9771792, −1.035611, 2.233716, −0.4014399, −0.9148072, 2.234226, 0.0272963, −0.8460628, |
| 2.222259, 0.4883847, −0.8285064, 2.989092, −1.110853, −1.159143, 3.088379, −0.6869915, −1.109002, |
| 3.144158, −0.4082251, −1.063707, 3.188751, −0.1072335, −1.031011, 2.642232, −1.035602, −1.148982, |
| 2.713693, −0.5124102, −1.032508, 2.768465, −0.117866, −0.9419523, 2.805518, 0.2871721, −0.8634454 |

Furthermore, as used in the disclosure, the term "limb" comprises limbs and body. It should be noted that the number of the nodes is not used to limit the present disclosure, and those skilled in the art could make appropriate replacements or adjustments according to this embodiment.

In addition, the device for motion prediction 100 may use three-dimensional software to project a masking object to the user 110 to generate training images of the user 110 with limbs occluded by the masking object. At the same time, in order to deal with the problem of complex backgrounds in the real environment, the device for motion prediction 100 could also add various background objects or background colors to the training images to improve the ability to resist background interference and overcome the limitations of traditional motion capture technologies that require specific background colors and clear fields.

The device for motion prediction 100 may use parameters of a real camera to generate training images similar to a real scene. Then, the device for motion prediction 100 may store a large number of training images including the occluded limbs into a database or a memory. Finally, the device for motion prediction 100 uses the motion capture data and the training images to train a prediction model.

Figure 3:
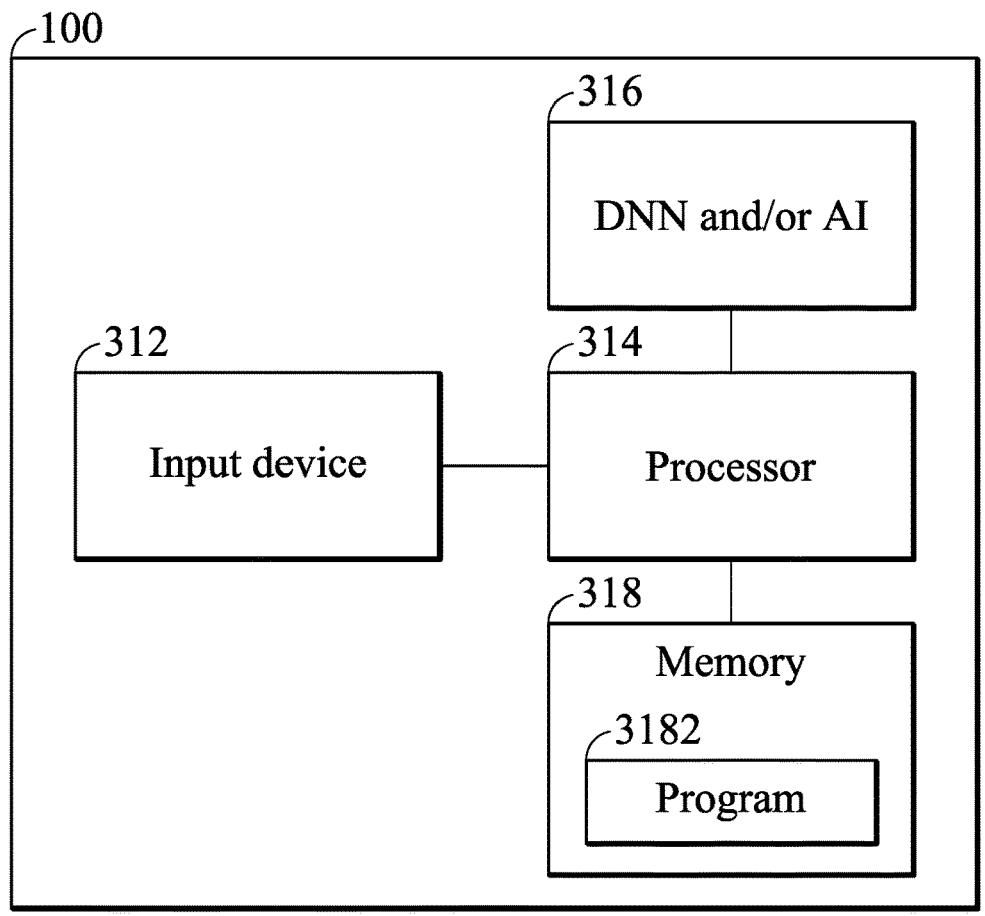
FIG. 3 is a simplified functional block diagram illustrating the device for motion prediction in FIG. 1 according to an embodiment of the disclosure.

FIG. 3 is a simplified functional block diagram illustrating the device for motion prediction 100 in FIG. 1 according to an embodiment of the disclosure. The device for motion prediction 100 may include an input device 312, wherein the input device 312 is configured to receive input data from a variety of sources. For example, the device for motion prediction 100 may receive image data transmitted from a network or other electronic devices. The device for motion prediction 100 may also receive training images which are images in which parts of the limbs are occluded. The device for motion prediction 100 may also be trained as an electronic device configured for motion prediction according to the received training images.

The device for motion prediction 100 may include a processor 314, a deep neural network (DNN) and/or artificial intelligence (AI) 316, and a memory 318 which may store program 3182, wherein the deep neural network is a deep residual network (ResNet) or other similar neural networks. In addition, the images may be stored in the memory 318. In one embodiment, the deep neural network and/or artificial intelligence 316 may be implemented in the processor 314. In another embodiment, the device for motion prediction 100 may be used with components, systems, sub-systems, and/or devices other than those that are depicted herein.

The types of device for motion prediction 100 range from small handheld devices, such as mobile telephones and handheld computers to large mainframe systems, such as mainframe computers. Examples of handheld computers include personal digital assistants (PDAs) and notebooks. The device for motion prediction 100 could be connected to other electronic devices by using the network. The network could include, but is not limited to, one or more local area networks (LANs), and/or wide area networks (WANs).

Figure 4:
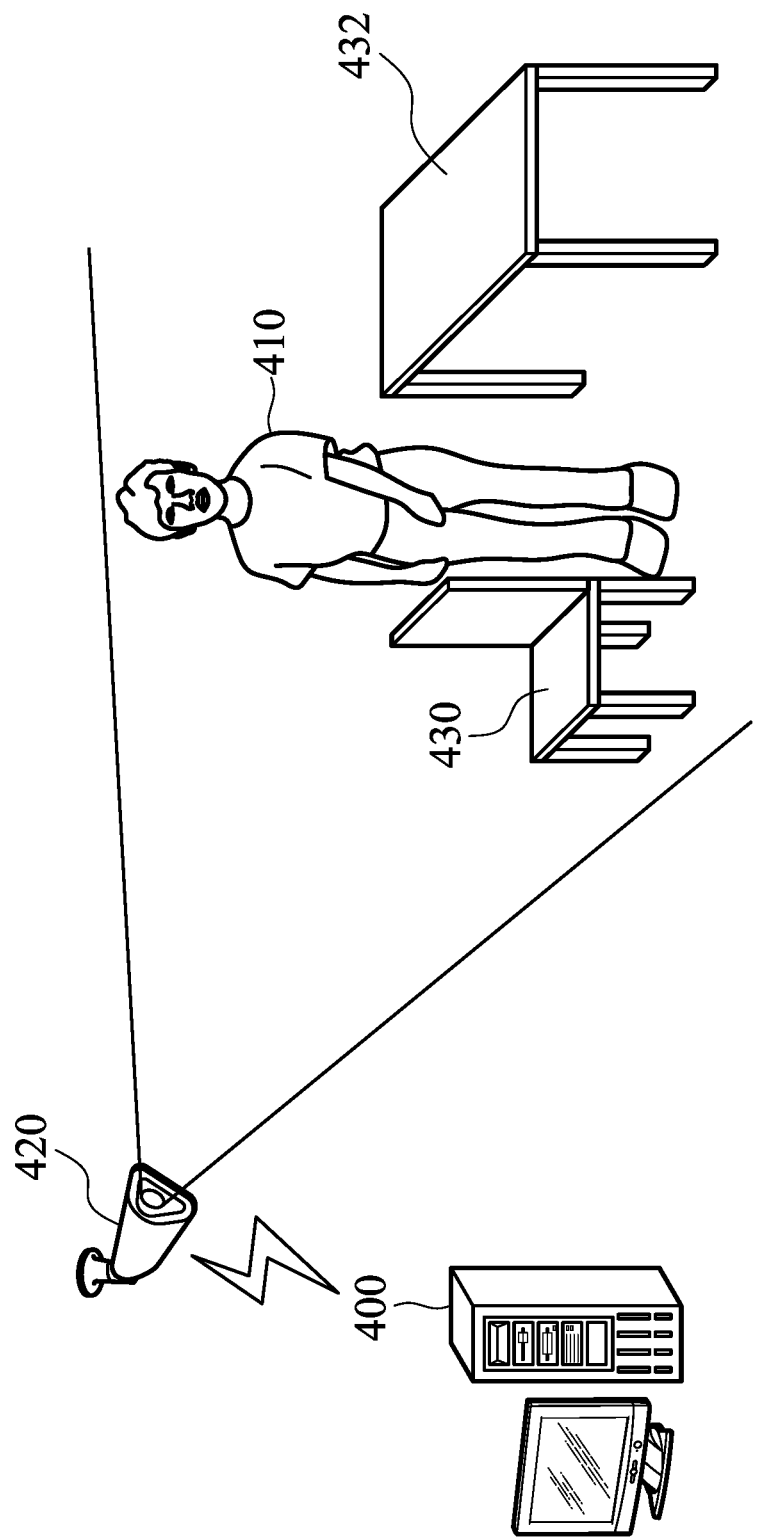
FIG. 4 is a schematic diagram illustrating an environment for predicting the motion of the target object using a device for motion prediction according to an embodiment of the present disclosure.

FIG. 4 is a schematic diagram illustrating an environment for predicting the motion of the target object 410 using a device for motion prediction 400 according to an embodiment of the present disclosure. For the convenience of describing the embodiments of the disclosure, the "target object" may be defined as a user, an animal, a robot, or other objects with joint parts. The "target object" could be the whole or a part of the object. That is, the target object must be a part of the object that has been trained for producing multi-view training images, and could not be an untrained object. It should be noted that, in this embodiment, the device for motion prediction 400 has already trained a prediction model.

As shown in FIG. 4, in this environment, only one image capturing device 420 is required to be set to capture the motion of the target object 410, wherein the image capturing device may be a color camera, a monochrome camera, an infrared camera, a thermal imaging camera or an optical radar, the field of view of the image capturing device 420 is 45 degrees to more than 220 degrees, and the image capturing device may transmit the generated motion images to the device for motion prediction 400 in a wireless or wired manner. In another embodiment, the image capturing device 420 may be further combined with a depth camera to improve the accuracy of predicting the motion of the target object 410. In one embodiment, the field of view of the depth camera is 45 degrees to 220 degrees. In addition, some masking objects could be placed in the environment. As shown in FIG. 4, a chair 430 may be placed in front of the target object 410, and a table 432 may be placed behind the target object 410.

Figure 5:
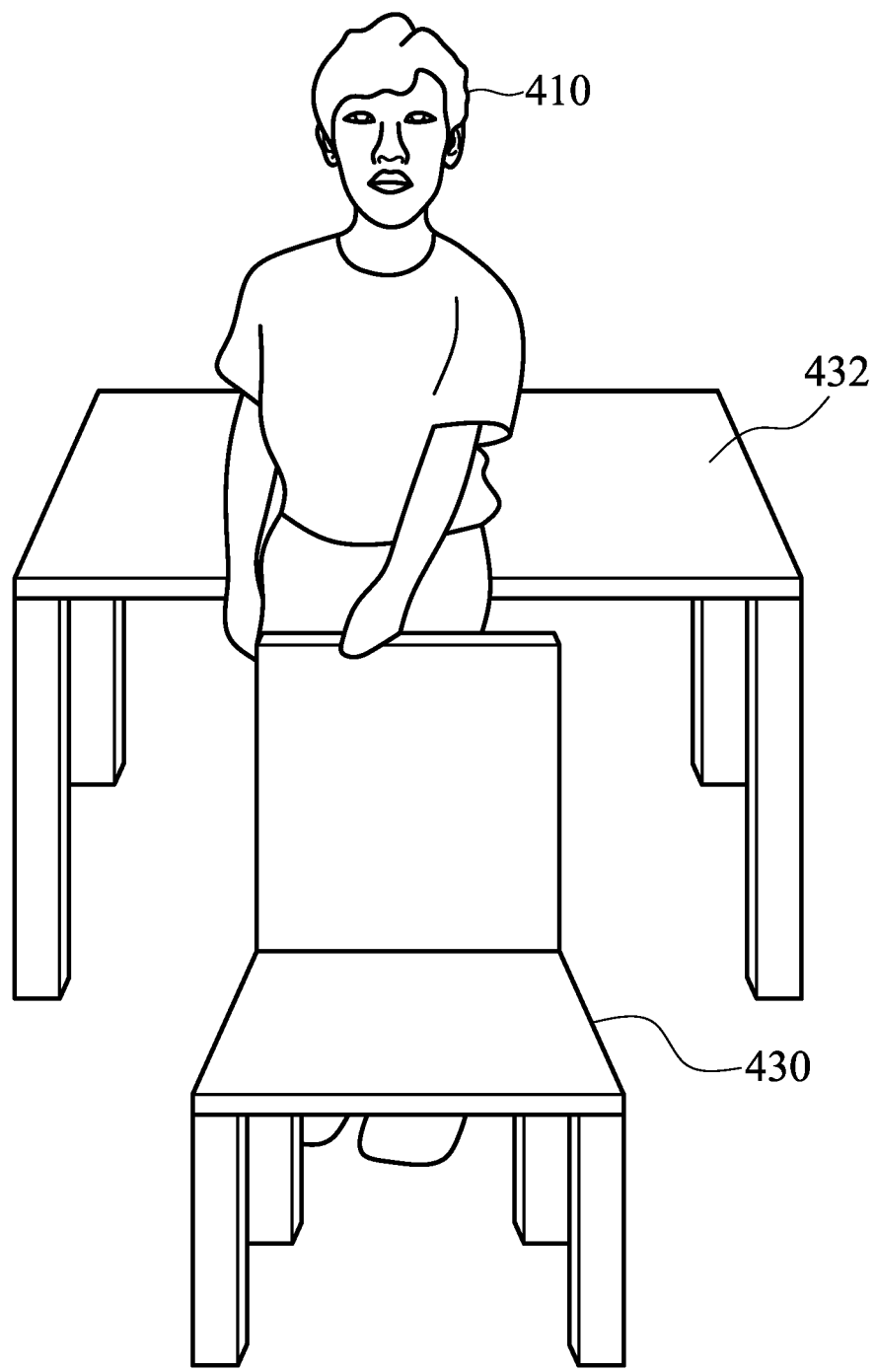
FIG. 5 shows a motion image captured by an image capturing device according to an embodiment of the disclosure.

The device for motion prediction 400 receives a motion image transmitted by the image capturing device 420, wherein the motion image is an image in which parts of the limbs of the target object 410 are unoccluded and other parts of the limbs of the target object 410 are occluded, as shown in FIG. 5. The device for motion prediction 400 may input the motion image into the prediction model to predict the joint information of the target object 410, wherein the joint information includes related information of the entire body of the target object 410 when the parts of the limbs of the target object 410 is occluded. For example, the three-dimensional coordinates (x, y, z) joint positions of the target object 410.

It should be understood that each of the components in the device for motion prediction shown in FIG. 1, FIG. 3 and FIG. 4 may be implemented via any type of computing device, such as the computing device 1000 described with reference to FIG. 10, for example.

Figure 6:
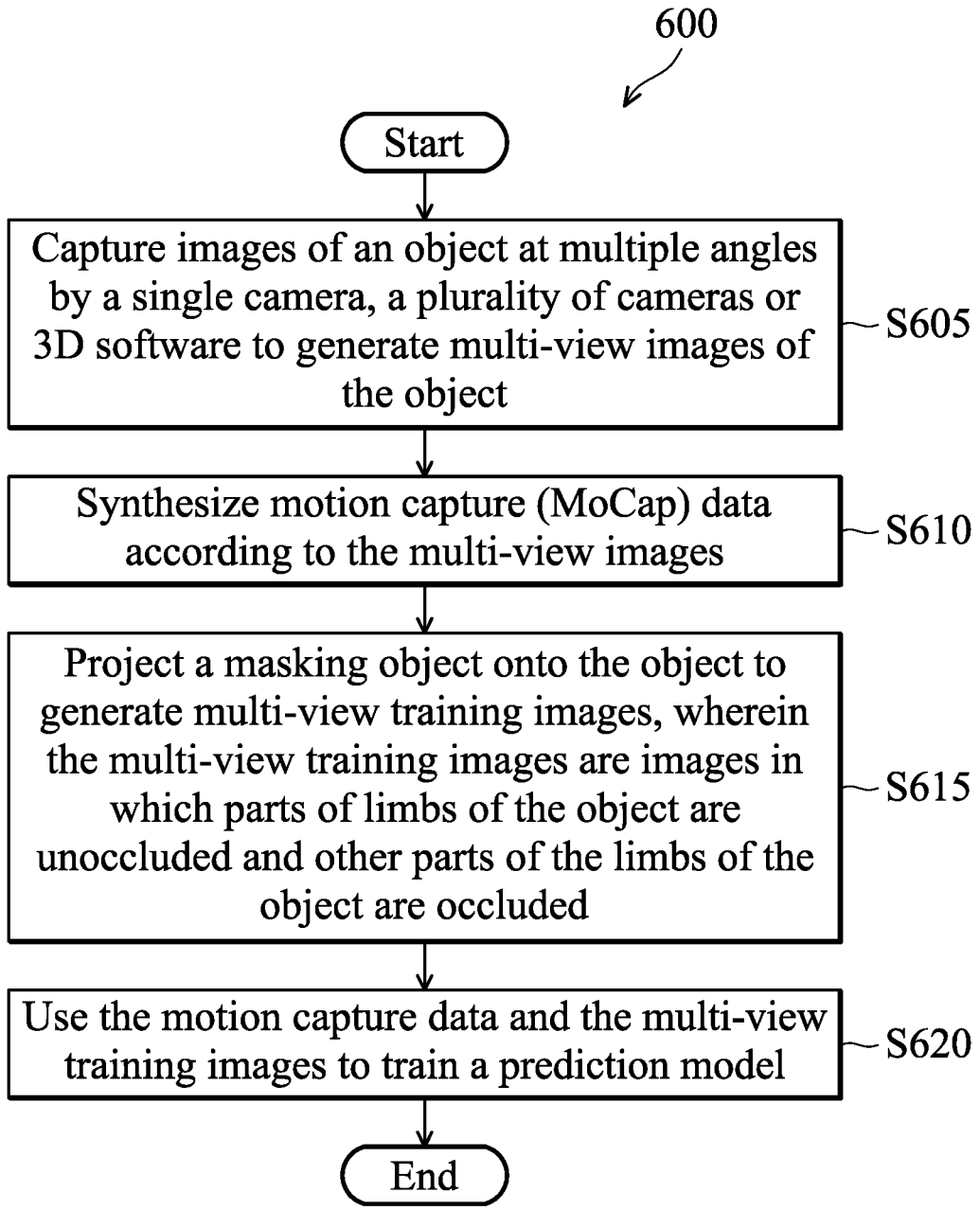
FIG. 6 is a flowchart illustrating a method for motion prediction according to an embodiment of the present disclosure.

FIG. 6 is a flowchart illustrating a method 600 for motion prediction according to an embodiment of the present disclosure. The method could be implemented in the processor of the device for motion prediction as shown in FIG. 1, FIG. 3 and FIG. 4.

In step S605, the device for motion prediction captures images of an object at multiple angles by a single camera, a plurality of cameras or 3D software to generate multi-view images of the object. Then, in step S610, the device for motion prediction synthesizes motion capture (MoCap) data according to the multi-view images. Next, in step S615, the device for motion prediction projects a masking object onto the object to generate multi-view training images, wherein the multi-view training images are images in which parts of limbs of the object are unoccluded and other parts of the limbs of the object are occluded. In step S620, the device for motion prediction uses the motion capture data and the multi-view training images to train a prediction model, wherein the prediction model is a model based on a deep neural network (DNN) or artificial intelligence (AI). Specifically, in step S620, the technique used in the prediction model uses image texture features, and joint positions of unoccluded limbs are detected from the image texture features. The prediction model further predicts joint positions of occluded limbs according to the joint positions of unoccluded limbs. This technology is based on the body pose hypothesis (that is, the relative relationship (such as a distance and an angle) between each joint position and the remaining joint positions) learned by the AI from the MoCap motion database to predict the positions where the remaining joints are most likely to appear in the image according to every joint position. Therefore, when the joint positions of parts of the limbs are occluded, the joint positions of occluded limbs could be predicted according to the relative relationship between the joints of the unoccluded limbs and the remaining joints, so as to detect the positions of the occluded limbs. The purpose is to make the predicted positions conform to the body pose hypothesis and make the predicted positions not appear in other incorrect positions, such as the background. In addition, since the human body has a left-right symmetrical feature, it is easy for some predicted positions of left-hand nodes to appear on the right hand when only the image texture features are used. However, since the positions of the left-hand nodes may be grouped according to the relative relationship with other left-hand nodes, the positions of the left-hand nodes may only appear in the left hand when the image texture features and the body pose hypothesis are used.

Figure 7:
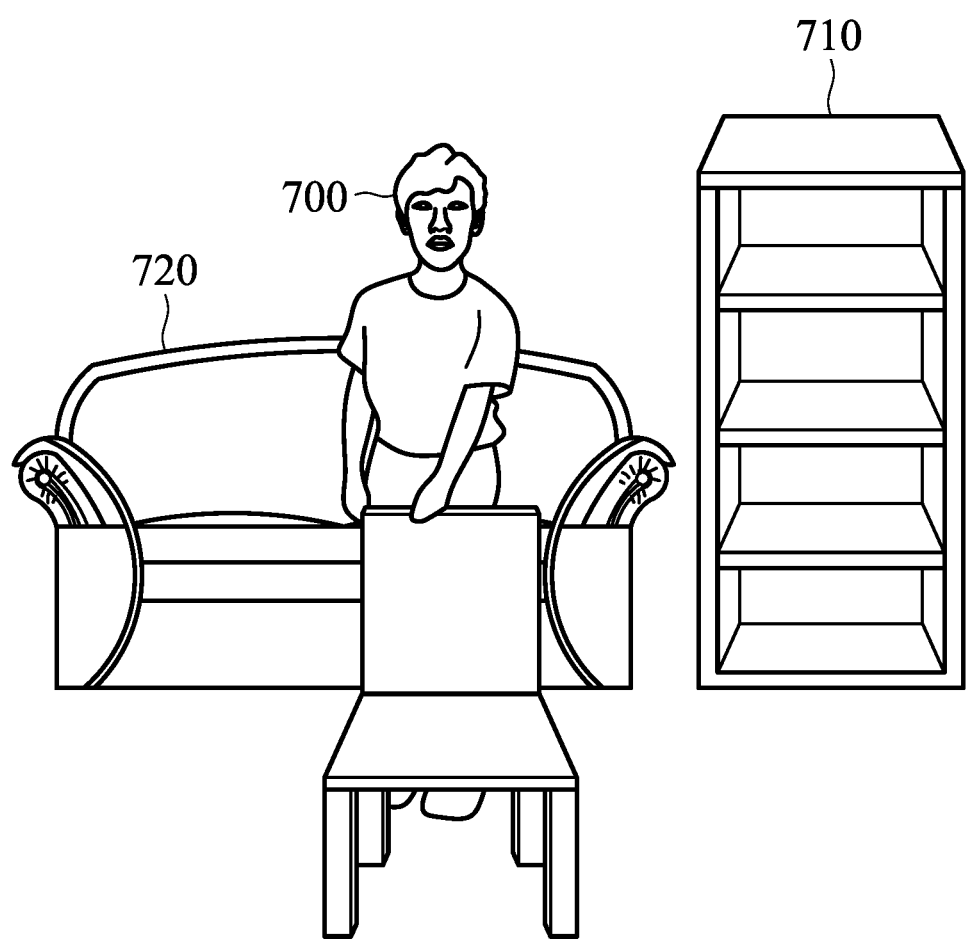
FIG. 7 shows a training image according to an embodiment of the disclosure.

In an embodiment, after projecting the masking object onto the object, the device for motion prediction may further add at least one background object to the training images or change a background color of the training images to enhance the robustness of the prediction model in different environments, wherein the training images comprise a first background object not connected to the object or a second background object connected to the object. FIG. 7 shows a training image according to an embodiment of the disclosure. As shown in FIG. 7, the bookcase 710 in FIG. 7 is the first background object that is not connected to the user 700, and the sofa 720 is the second background object that is connected to the user 700.

Figure 8:
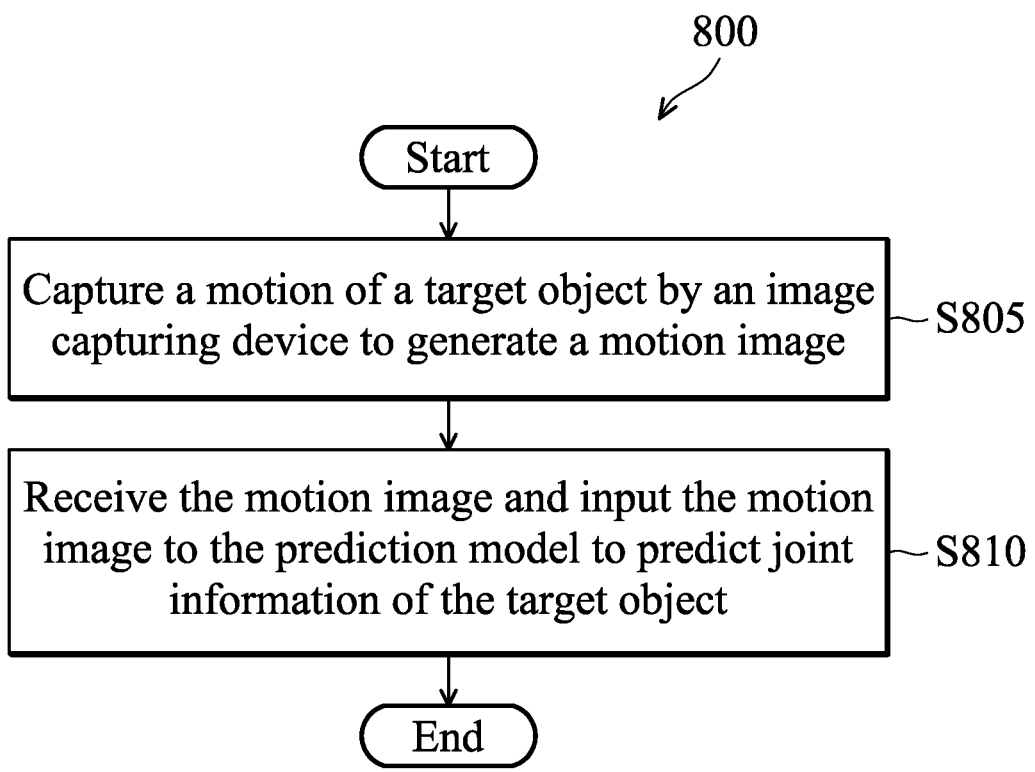
FIG. 8 is a flowchart illustrating a method for motion prediction according to an embodiment of the present disclosure.

FIG. 8 is a flowchart illustrating a method 800 for motion prediction according to an embodiment of the present disclosure. The method could be implemented in the processor of the device for motion prediction as shown in FIG. 1, FIG. 3 and FIG. 4.

Before the start of the flowchart, the device for motion prediction has previously trained a prediction model according to the flowchart in FIG. 6. In step S805, the device for motion prediction captures a motion of a target object by an image capturing device to generate a motion image, wherein the field of view of the image capturing device is 45 degrees to 220 degrees. In step S810, the device for motion prediction receives the motion image and inputs the motion image to the prediction model to predict joint information of the target object, wherein the motion image is an image in which parts of the limbs of the target object are unoccluded and other parts of the limbs of the target object are occluded.

Specifically, when the limbs of the target object are unoccluded, it means that the entire limbs of the target object are unoccluded. When parts of the limbs of the target object are unoccluded and other parts of the limbs of the target object are occluded, it means that parts of the limbs of the target object are occluded by other masking objects.

In step S810, when the motion image is an image in which the limbs of the target object are unoccluded, the device for motion prediction may obtain a training image (that is, the training image in which the limbs of the user are unoccluded) corresponding to the motion image from the database or the memory. In other words, the similarity between the joint information of the training image and the joint information of the motion image is the closest. The joint information includes relevant information (for example, three-dimensional coordinates of all joint positions of the object in the training image) of the limbs of the whole body when the limbs of the whole body are unoccluded. Next, the device for motion prediction inputs the joint information of the training image and the motion image to the prediction model and performs correlation calculation and prediction to predict the joint information of the target object (for example, the three-dimensional coordinates of all joint positions of the target object).

In step S810, when the motion image is an image in which parts of the limbs of the target object are unoccluded and other parts of the limbs of the target object are occluded, the device for motion prediction may obtain the joint information of the training image (that is, the training image in which parts of the limbs of the user is occluded) corresponding the motion image from the database or the memory. In other words, the similarity between the joint information of the training image and the joint information of the motion image is the closest. The joint information includes relevant information (for example, three-dimensional coordinates of all joint positions of the object in the training image) of the limbs of the whole body when parts of the limbs of the target object are occluded. Next, the device for motion prediction inputs the joint information of the training image and the motion image to the prediction model and performs correlation calculation and prediction to predict the joint information of the target object (for example, the three-dimensional coordinates of all joint positions of the target object).

In an embodiment, the device for motion prediction may further capture the motion of the target object by a depth camera to generate a depth map. The device for motion prediction receives the depth map and calculates an error of the joint information in a real space according to the depth map to correct the joint information.

The following will explain in detail how the device for motion prediction calculates an error of the joint information in the real space according to the depth map to correct the joint information. In one embodiment, it is assumed that the depth prediction value generated from the motion image is $\hat{d}$ and the depth obtained from the depth map is $\bar{d}$. The depth $d_i$ of a joint i could be expressed as follows $$d_i = \|\hat{d}_i - \varepsilon_i\|$$

wherein $\varepsilon_i$ is the error of joint i in the real space. $\varepsilon_i$ could be expressed by the following formula:

$$\varepsilon_i = \frac{\sum_{i=1}^{n=10} \|\bar{d}_i - (\hat{d}_i + \delta_i)\|}{n}$$

wherein $\delta_i$ is the offset of the joint i recorded in the initial motion, and n is the number of operations performed on the joint i.

Figure 9A:
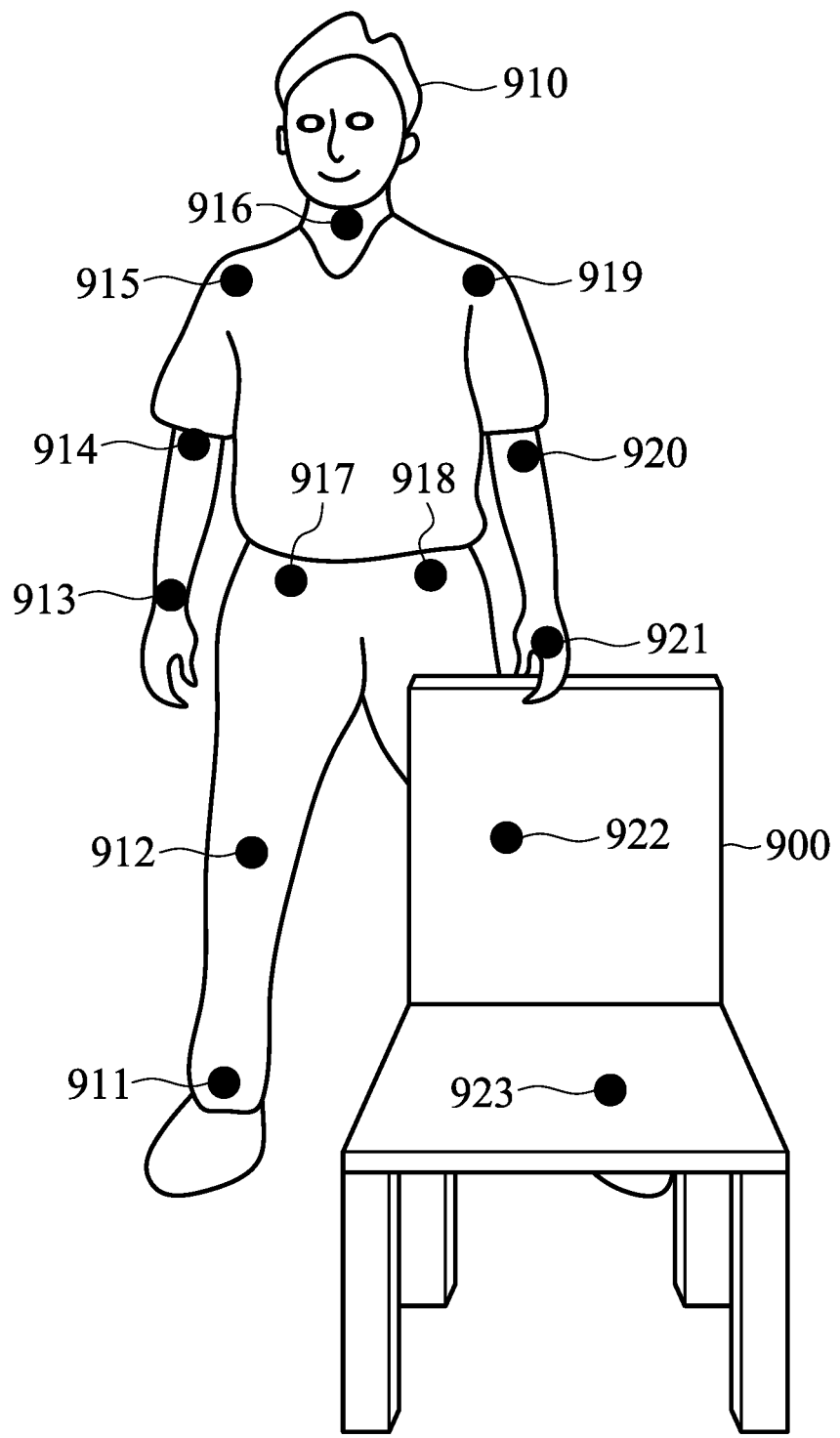
FIGS. 9A-9D are schematic diagrams illustrating the joint information of the target object predicted by using the device for motion prediction according to an embodiment of the present disclosure.
Figure 9B:
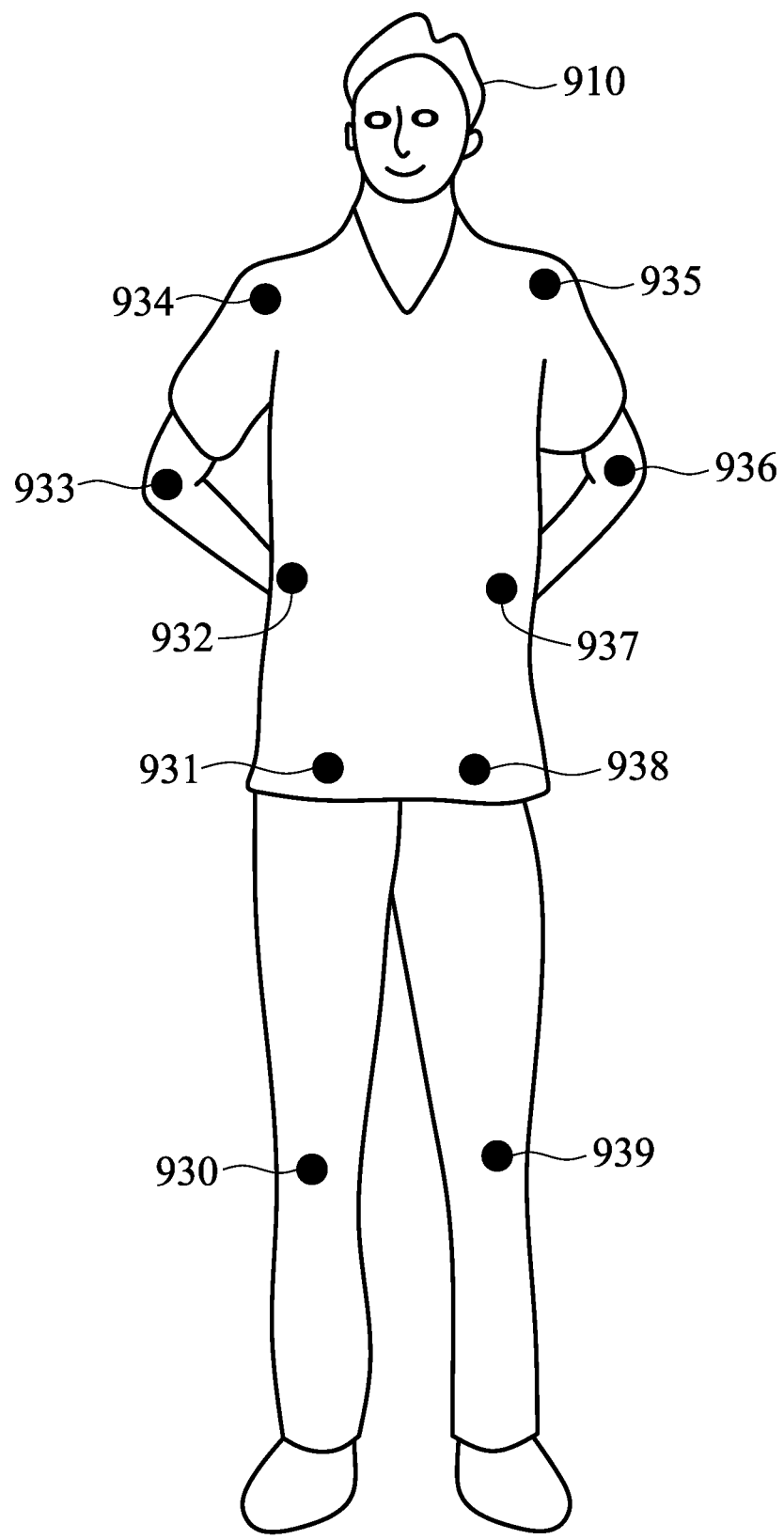
Figure 9C:
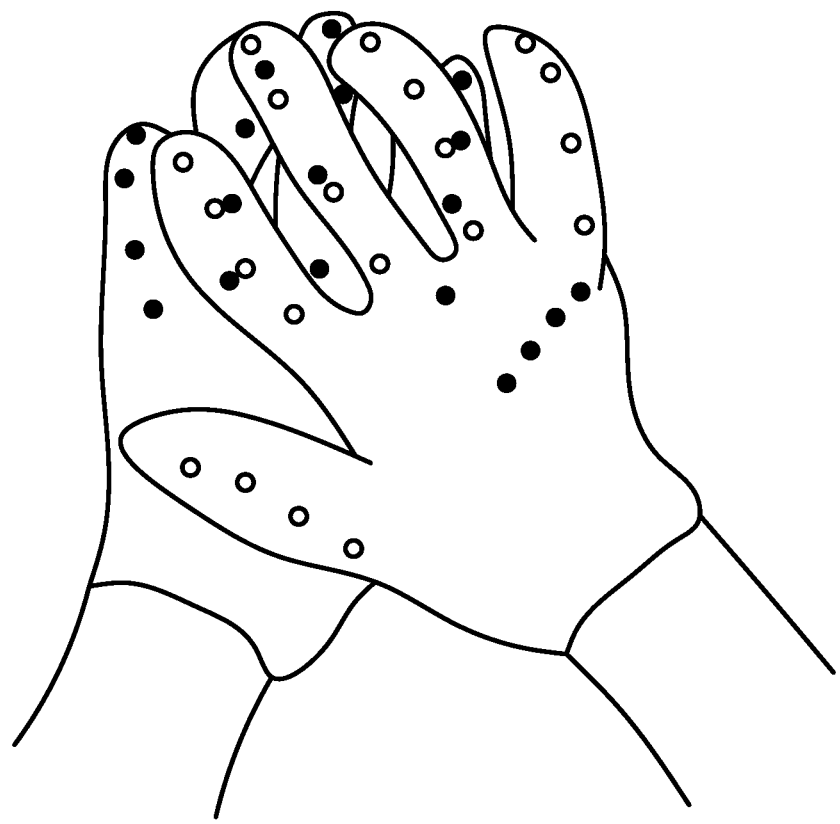
Figure 9D:
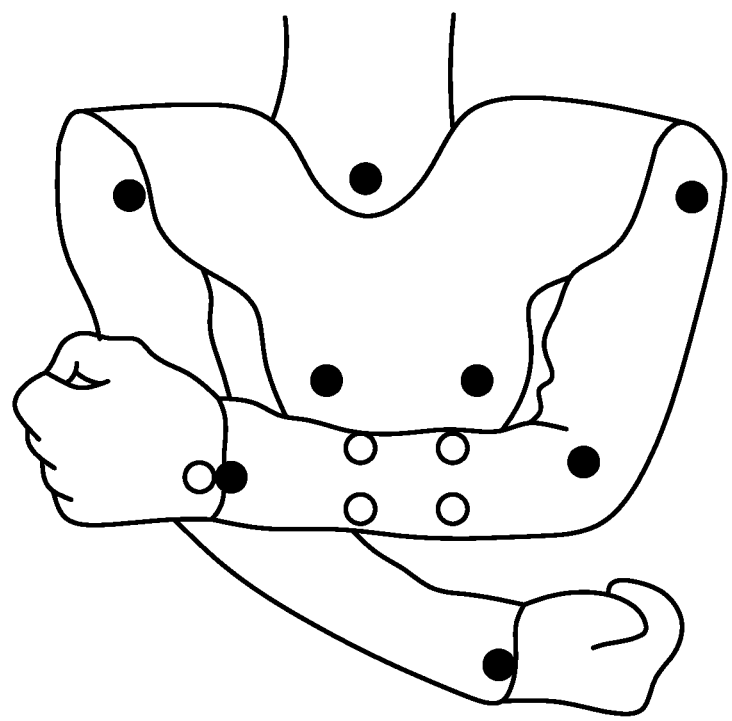

FIGS. 9A~9D are schematic diagrams illustrating the joint information of the target object predicted by using the device for motion prediction according to an embodiment of the present disclosure. As shown in FIG. 9A, the device for motion prediction could predict the joint information of the target object 910, even the joints 922 and 923 that are occluded by the chair 900. Besides, in addition to predicting the situation of being occluded by the masking object in the environment, the device for motion prediction could also predict the self-occlusion of the target object 910 itself. As shown in FIG. 9B, the joint information of the hand joints 932 and 937 that are occluded by the target object 910 itself could also be predicted. FIG. 9C is another example of self-occlusion. As shown in FIG. 9C, when the hands are overlapped (the right hand is on the top and the left hand is on the bottom), the device for motion prediction provided in the disclosure may detect the joints of the right hand on the top and also predict other joints of the left hand occluded by the right hand according to the unoccluded joints of the left hand to reach the purpose that the joints of the upper right hand and the lower left hand are detected at the same time. Similarly, in addition to the hand, the device for motion prediction provided in the present disclosure could also predict the occluded joints from a top-down perspective. As shown in FIG. 9D, when the two arms are partially overlapped (the left arm is on the top and the right arm is on the bottom) and the joints of the feet are occluded, the device for motion prediction could not only detect the joints of the left arm on the top, but also predict other joints of the right arm and the feet unoccluded by the left arm to reach the purpose that the joints of the upper left arm, the lower right arm and the feet are detected at the same time.

As described above, the method for motion prediction disclosed in the present disclosure trains a prediction model in advance with images in which parts of the limbs of the object are occluded to achieve multi-view recognition of the object. In addition, the positions of occluded limbs of the object could be predicted by using a single image capturing device in a single perspective and the object needs not be placed in a specific background or a clear field. The convenience in use is increased in the disclosure.

Having described embodiments of the present disclosure, an exemplary operating environment in which embodiments of the present disclosure may be implemented is described below. Referring to FIG. 10, an exemplary operating environment for implementing embodiments of the present disclosure is shown and generally known as a computing device 1000. The computing device 1000 is merely an example of a suitable computing environment and is not intended to limit the scope of use or functionality of the disclosure. Neither should the computing device 1000 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

Figure 10:
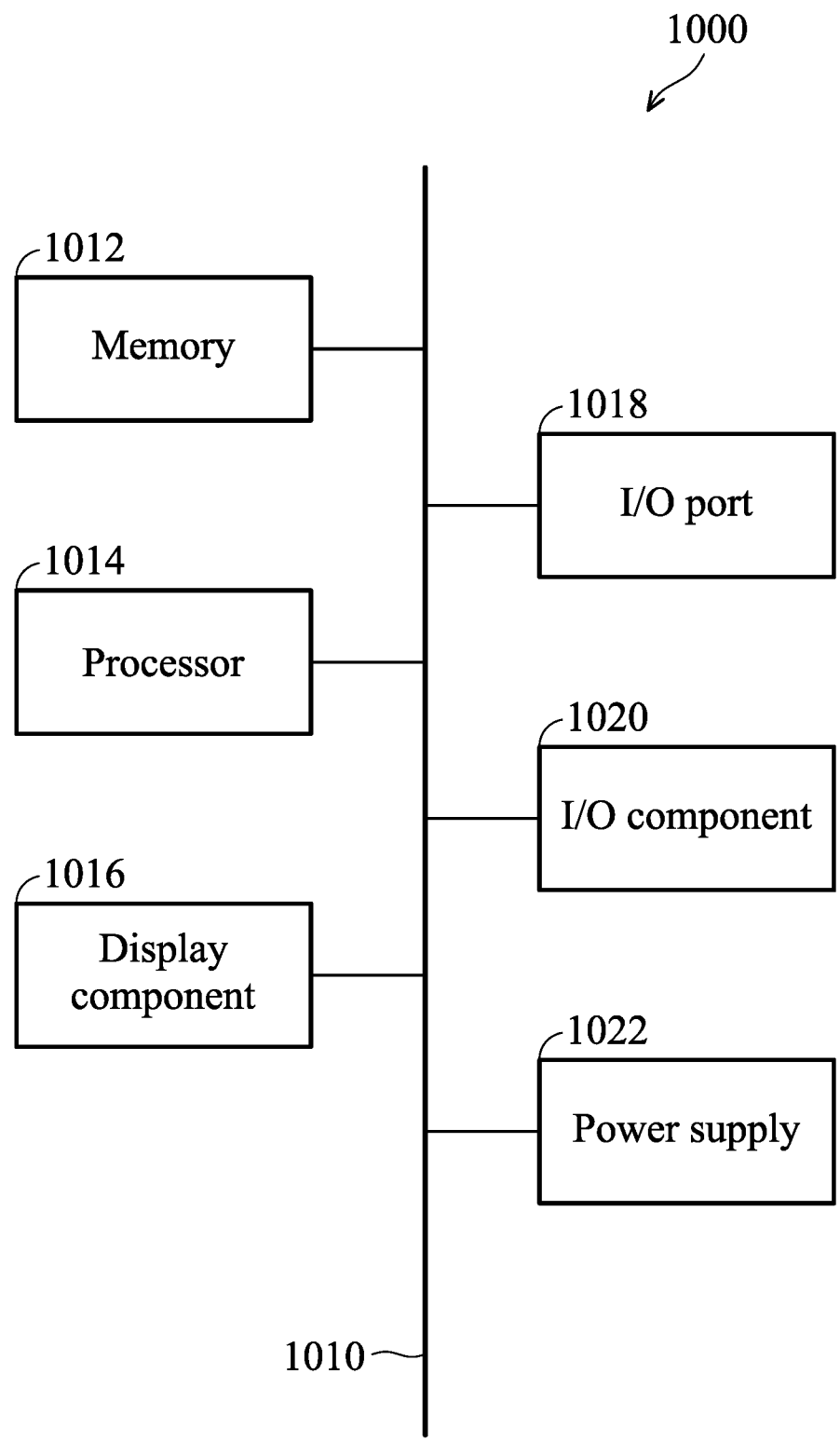
FIG. 10 illustrates an exemplary operating environment for implementing embodiments of the present disclosure.

With reference to FIG. 10, the computing device 1000 may include a bus 1010 that is directly or indirectly coupled to the following devices: one or more memories 1012, one or more processors 1014, one or more display components 1016, one or more input/output (I/O) ports 1018, one or more input/output components 1020, and an illustrative power supply 1022. The bus 1010 may represent one or more kinds of busses (such as an address bus, data bus, or any combination thereof). Although the various blocks of FIG. 10 are shown with lines for the sake of clarity, and in reality, the boundaries of the various components are not specific. For example, the display component such as a display device may be considered an I/O component and the processor may include a memory.

The computing device 1000 typically includes a variety of computer-readable media. The computer-readable media could be any available media that could be accessed by computing device 1000 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which could be used to store the desired information and which could be accessed by the computing device 1000. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1012 may include computer-storage media in the form of volatile and/or nonvolatile memory. The memory may be removable, non-removable, or a combination thereof. Exemplary hardware devices include solid-state memory, hard drives, optical-disc drives, etc. The computing device 1000 includes one or more processors that read data from various entities such as the memory 1012 or the I/O components 1020. The presentation component(s) 1016 present data indications to a user or other device. Exemplary presentation components include a display device, speaker, printing component, vibrating component, etc.

The I/O ports 1018 allow the computing device 1000 to be logically coupled to other devices including the I/O components 1020, some of which may be embedded. Illustrative components include a microphone, joystick, game pad, satellite dish, scanner, printer, wireless device, etc. The I/O components 1020 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, face recognition, biometric recognition, gesture recognition both on screen and adjacent to the screen, air gestures, head and eye tracking, touch recognition associated with displays on the computing device 1000, or any combination of. The computing device 1000 may be equipped with depth cameras, such as stereoscopic camera systems, infrared camera systems, RGB camera systems, any combination of these to realize gesture detection and recognition. Furthermore, the computing device 1000 may be equipped with accelerometers or gyroscopes that enable detection of motion. The output of the accelerometers or gyroscopes may be provided to the display of the computing device 1000 to carry out immersive augmented reality or virtual reality.

Furthermore, the processor 1014 in the computing device 1000 could execute the program code in the memory 1012 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," and "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for motion prediction, comprising:
capturing, by a single camera, a plurality of cameras or 3D software, images of an object at multiple angles to generate multi-view images of the object;
synthesizing motion capture (MoCap) data according to the multi-view images;
projecting a masking object onto the object to generate multi-view training images, wherein the multi-view training images are images in which parts of limbs of the object are unoccluded and other parts of the limbs of the object are occluded; and
using the motion capture data and the multi-view training images to train a predictive model.

2. The method for motion prediction as claimed in claim 1, further comprising:
capturing, by an imaging capturing device, a motion of a target object to generate a motion image; and
receiving the motion image, and inputting the motion image into the prediction model to predict joint information of the target object.

3. The method for motion prediction as claimed in claim 2, wherein the motion image is an image in which parts of the limbs of the target object are unoccluded and other parts of the limbs of the target object are occluded.

4. The method for motion prediction as claimed in claim 2, wherein the target object is the whole or a part of the object.

5. The method for motion prediction as claimed in claim 2, wherein the motion image is an image in which parts of the limbs of the target object are unoccluded and other parts of the limbs of the target object are self-occluded by the target object.

6. The method for motion prediction as claimed in claim 2, further comprising:
capturing, by a depth camera, the motion of the target object to generate a depth map; and
receiving the depth map and calculating an error of the joint information in a real space according to the depth map to correct the joint information.

7. The method for motion prediction as claimed in claim 1, wherein after projecting the masking object onto the object, the method further comprises:
adding at least one background object to the multi-view training image, wherein the multi-view training image comprises a first background object not connected to the object or a second background object connected to the object.

8. The method for motion prediction as claimed in claim 1, wherein after projecting the masking object onto the object, the method further comprises:
changing a background color of the multi-view training image.

9. The method for motion prediction as claimed in claim 1, wherein the prediction model uses image texture features to detect first joint positions where parts of the limbs are unoccluded, and predicts second joint positions where other parts of the limbs of the object are occluded according to the first joint positions where the parts of the limbs are unoccluded; and
wherein the second joint positions are predicted according to a relative relationship between the first joint positions and the remaining joint positions.

10. A system for motion prediction, comprising:
a device for motion prediction, wherein the device for motion prediction executes:
capturing, by a single camera, a plurality of cameras or 3D software, images of an object at multiple angles to generate multi-view images of the object;
synthesizing motion capture (MoCap) data according to the multi-view images;
projecting a masking object onto the object to generate multi-view training images, wherein the multi-view training images are images in which parts of limbs of the object are unoccluded and other parts of the limbs of the object are occluded; and
using the motion capture data and the multi-view training images to train a predictive model.

11. The system for motion prediction as claimed in claim 10, further comprising:
an image capturing device, connected to the device for motion prediction and used to capture a motion of a target object to generate a motion image;
wherein the device for motion prediction receives the motion image and inputs the motion image into the prediction model to predict joint information of the target object.

12. The system for motion prediction as claimed in claim 11, wherein the motion image is an image in which parts of the limbs of the target object are unoccluded and other parts of the limbs of the target object are occluded.

13. The system for motion prediction as claimed in claim 11, wherein the target object is the whole or a part of the object.

14. The system for motion prediction as claimed in claim 11, wherein the motion image is an image in which parts of the limbs of the target object are unoccluded and other parts of the limbs of the target object are self-occluded by the target object.

15. The system for motion prediction as claimed in claim 11, further comprising:
a depth camera, connected to the device for motion prediction and used to capture the motion of the target object to generate a depth map;
wherein the device for motion prediction receives the depth map and calculates an error of the joint information in a real space according to the depth map to correct the joint information.

16. The system for motion prediction as claimed in claim 10, wherein after projecting the masking object onto the object, the device for motion prediction further executes:
adding at least one background object to the multi-view training image, wherein the multi-view training image comprises a first background object not connected to the object or a second background object connected to the object.

17. The system for motion prediction as claimed in claim 10, wherein after projecting the masking object onto the object, the device for motion prediction further executes:
changing a background color of the multi-view training image.

18. The system for motion prediction as claimed in claim 10, wherein the prediction model uses image texture features to detect first joint positions where the parts of the limbs are unoccluded, and predicts second joint positions where other parts of the limbs of the object are occluded according to the first joint positions where parts of the limbs are unoccluded; and wherein the second joint positions are predicted according to a relative relationship between the first joint positions and the remaining joint positions.

\* \* \* \* \*